O. E. PILLARD.

PERMUTATION LOCK.

No. 10,246. Reissued Nov. 21, 1882.

Witnesses.
Thos F. C. Preinkert
Fred A. Powell

Inventor:
Oliver E. Pillard
by Crosby & Gregory Attys.

N. PETERS. Photo-Lithographer, Washington, D. C.

UNITED STATES PATENT OFFICE.

OLIVER E. PILLARD, OF CAMBRIDGE, MASSACHUSETTS.

PERMUTATION-LOCK.

SPECIFICATION forming part of Reissued Letters Patent No. 10,246, dated November 21, 1882.

Original No. 238,608, dated March 8, 1881. Application for reissue filed September 4, 1882.

*To all whom it may concern:*

Be it known that I, OLIVER E. PILLARD, of Cambridge, in the county of Middlesex and State of Massachusetts, have invented a certain new and useful Improvement in Combination-Locks, of which the following is a description, reference being had to the accompanying drawings, where—

Figure 1:
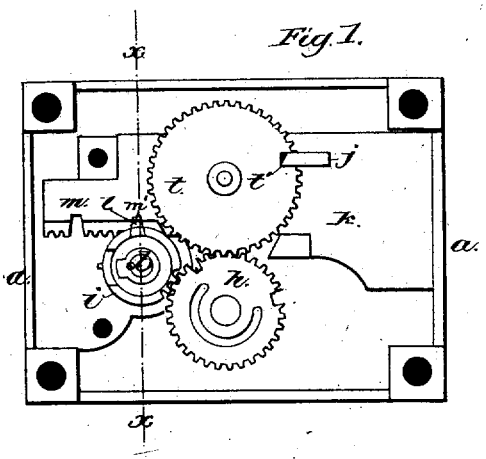
Figure 2:
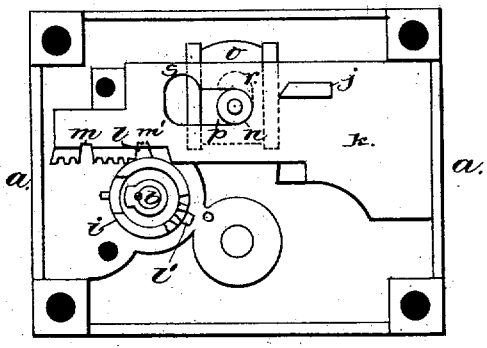
Figure 3:
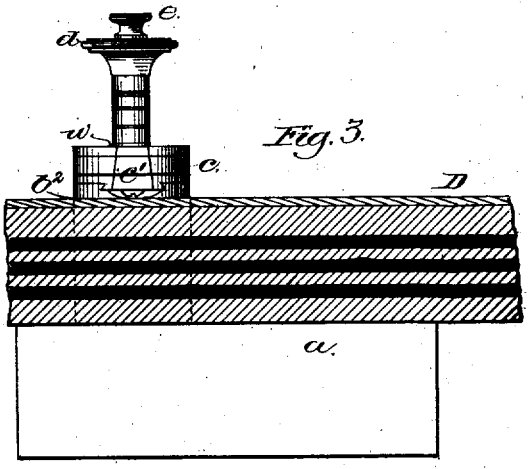
Figure 4:
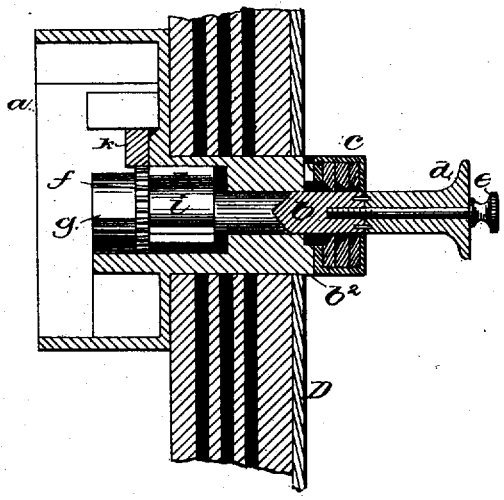

Figure 1 is a view of the interior of the lock from its rear side with the covering-plate and cap-block removed. Fig. 2 is a view the same as Fig. 1, except that the pile of gears overlying the bolt is represented as removed. Fig. 3 is a view of the lock attached to a door. Fig. 4 represents the lock in partial vertical section on plane *x x*, the lock being attached to the door.

My invention herein described is an improvement upon that kind of lock described in Letters Patent of the United States granted to myself and E. M. McPherson, dated April 24, A. D. 1877, and numbered 189,902. In the use of the lock described in that patent the operator throws the bolt to lock or unlock the lock by the rotation of the key-shaft when the latter is drawn outward into its outermost position, the usual spur at the outer end of the key-shaft or spindle being then outside the key, and he can remove the key from the lock both when the bolt is in or out of the case or the lock is unlocked or locked; but to permit the removal of the key from the lock the key-shaft must be entirely in, so that the spur referred to at the outer end of the key-shaft will be at the rear of the key, and the combination can be changed only when the key is removed from the lock. The key herein used, as in the said patent, is composed of a collection of open-centered disks contained within a cylindrical case, and the spur on the key-shaft passes through the said disks.

In the drawings, *a* denotes the lock-case; *b*, the key-shaft at the front side thereof and extended through the door D; and *c* denotes the key as a whole attached to the end of hub $b^2$ by a dovetail tenon, *c'*, sliding vertically or radially into a corresponding dovetail mortise in the end of the hub. *d* denotes the knob, which, made temporarily fast to the key-shaft by the central set-screw, *e*, is grasped by the operator to give the requisite rotary motions to the key-shaft. The movements of the key-shaft to actuate the bolt *k* to lock and unlock the lock are governed by the slotted disks of the key, as is well known in the art. Near its inner end the key-shaft bears the usual gear, *f*, having both the rotary and longitudinal movements of such shaft. This shaft *b* has upon it, at the outer side of the gear *f*, the gear-lock *g*, it having the longitudinal but not the rotary motions of the key-shaft. The office of the gear-lock *g* is to lock such of the pile of gears *h* as are on the outer side of gear *f* and not in mesh therewith from rotation for the time being. This key-shaft also has upon it at the inner side of gear *f* the gear-lock *i*, having the longitudinal but not the rotary motions of the key-shaft. The office of the gear-lock *i* is by its feather *l'* to lock such of the pile of gears *h* as are on the inner side of gear *f* and not in mesh therewith from rotation when not engaged by the gear *f*.

In locking and unlocking the lock the rotating gear *f* acts successively upon the gears *h* as the key-shaft is moved longitudinally, and these gears *h* in turn act successively upon the gears *t* and move them into requisite position and adjustment, the proper position for unlocking the lock being that in which all the mortises *t'* of the gears *t* coincide with and are in position to admit the dog or pawl *j* of the bolt *k*. The gear-lock *i* has a feather, *l*, which, when the bolt *k* is out or locked, coincides with the mortise *m* in the bolt *k* and permits the key-shaft to be moved endwise within the knob *d*—a movement necessary preparatory to removing the key. When the bolt is in the lock, as in the drawings, the inward movement of the key-shaft is obstructed or arrested by the feather *l* striking the bolt or the rack-teeth fixed thereto.

In the construction of the lock shown in the said patent there was a mortise in the bolt located at the point *m'*, (shown in dotted lines,) and it was this mortise which enabled the operator to move the key-shaft endwise into the key, remove the key, and disarrange the combination. This mortise *m'* in the former construction was necessitated by the fact that the combination was made changeable when the bolt was unlocked. The mortise referred to as made in the bolt of the patent cited necessitated that the key-shaft be moved endwise into the key and lock when the bolt was in the lock or unlocked, and consequently the combination was changed when the bolt was in or unlocked. In this my present invention, as in the said patent, it is necessary that the gears *h* be rotated while unmeshed from the gears *t*. To effect this unmeshing of the gears *t* and *h*, the gears *t* are hung on a short shaft, *n*, fixed to a vertically-moving slide, *o*, which can be moved vertically only when the bolt *k* is out or the lock is locked, for only at such positions of the said bolt is the slot *s* at the rear of the slot *p* in the said bolt placed in position to coincide with the said shaft *n*. In the patent referred to the slot corresponding with the slot *s* was at the opposite end of the horizontal part of the slot *p* of the bolt, and hence the gears could be unmeshed only when the bolt was in or the lock unlocked. The spur on the key-shaft is herein marked *w*. In a still earlier form of lock than that shown in the patent referred to it was possible while the lock was unlocked to make a different combination in the key, generally through ignorant intermeddling, and therewith lock the lock on an improper and perhaps unknown combination, and means were provided in the Patent No. 189,902 referred to to prevent such trouble. In the present construction the key cannot be removed from the key-shaft and hub when the lock is unlocked, and as such removal is necessary in order to change the combination in the key it results that disarrangement of the combination in the key is impossible.

I claim—

1. In a permutation-lock, the key and rotating and longitudinally-movable key-shaft, combined with the bolt and with means to prevent the endwise or longitudinal movement of the key-shaft into the key when the lock is unlocked and the bolt drawn into the case, substantially as described.

2. In combination, the vertically-moving shaft carrying gears *t*, and the bolt *k*, provided with the horizontal slot *p* and the vertical slot *s* at the rear end of slot *p*, all substantially as described, and for the purposes set forth.

3. The bolt *k*, provided with the vertical slot *s* at the rear end of horizontal slot *p*, and also provided with the single mortise *m*, in combination with the vertically-movable shaft *n*, carrying gears *t*, the gears *h*, the key-shaft *b*, carrying gear *f*, the gear-lock *g*, and the gear-lock *i*, carrying the feather *l*, all substantially as described, and for purposes set forth.

OLIVER E. PILLARD.

Witnesses:
G. W. GREGORY,
B. J. NOYES.